United States Patent
Rutledge et al.

(10) Patent No.: US 7,432,908 B2
(45) Date of Patent: Oct. 7, 2008

(54) CONTROLLER, SYSTEM AND METHOD FOR CONTROLLING A CURSOR

(75) Inventors: Joseph Dela Rutledge, Mahopac, NY (US); Robert Stephen Olyha, Jr., LaGrange, NY (US)

(73) Assignee: International Business Machines Corporation, Armonk, NY (US)

( * ) Notice: Subject to any disclaimer, the term of this patent is extended or adjusted under 35 U.S.C. 154(b) by 440 days.

(21) Appl. No.: 10/720,186

(22) Filed: Nov. 25, 2003

(65) Prior Publication Data

US 2005/0110745 A1    May 26, 2005

(51) Int. Cl.
 *G06F 3/033* (2006.01)
(52) U.S. Cl. ....................................... 345/157
(58) Field of Classification Search .......... 345/156–172
See application file for complete search history.

(56) References Cited

U.S. PATENT DOCUMENTS

| | | | | |
|---|---|---|---|---|
| 5,541,622 A | * | 7/1996 | Engle et al. | 345/161 |
| 5,854,621 A | * | 12/1998 | Junod et al. | 345/158 |
| 6,014,900 A | * | 1/2000 | Vandenboom et al. | 73/781 |
| 6,816,150 B2 | * | 11/2004 | Casebolt et al. | 345/166 |
| 2003/0117370 A1 | * | 6/2003 | Van Brocklin et al. | 345/156 |
| 2004/0066368 A1 | * | 4/2004 | May | 345/156 |

* cited by examiner

*Primary Examiner*—Amr Awad
*Assistant Examiner*—Stephen G Sherman
(74) *Attorney, Agent, or Firm*—Stephen C. Kaufman, Esq.; McGinn IP Law Group, PLLC

(57) ABSTRACT

A controller for controlling a cursor includes an identifying module for identifying at least one of a first period when a cursor is in motion and a second period when the cursor is not in motion, and a calibrating module for calibrating an input parameter signal using a first hands-off test during the first period and a second hands-off test, different than the first hands-off test, during the second period.

23 Claims, 3 Drawing Sheets

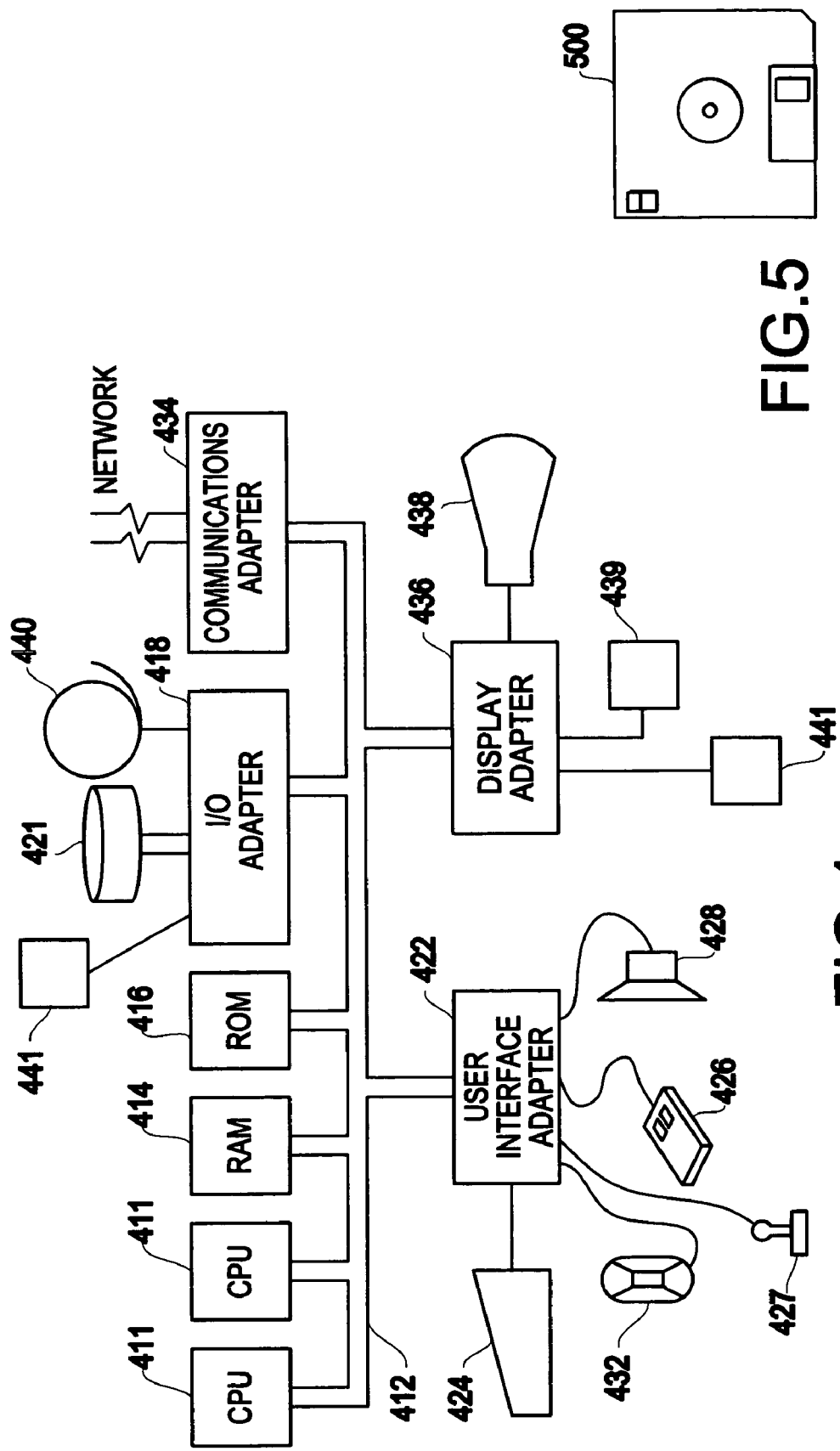

CONTROLLER, SYSTEM AND METHOD FOR CONTROLLING A CURSOR

BACKGROUND OF THE INVENTION

1. Field of the Invention

The present invention relates to a controller, system and method for controlling a cursor and, more particularly, to a controller, system and method for controlling a cursor in which an input parameter signal is calibrated using a first hands-off test when a cursor is in motion and a second hands-off test, different than the first hands-off test, when a cursor is not in motion.

2. Description of the Related Art

Pointing stick cursor control systems, such as the TrackPoint® system, sense finger force at high precision (compared to overload capacity) and translate it (via a transfer function) to velocity of movement of the cursor on the graphical user interface (GUI) display screen. The electrical signals produced by the sensing element are necessarily small (microvolts) and subject to relatively slow drift due to temperature and other environmental changes.

This drift must be detected and removed from the significant signal, otherwise incorrect movement signals will be transmitted, with the most noticeable effect being spontaneous movement of the cursor. This is done by identifying periods when the stick is not being touched (hands-off periods), and using the signal detected at these times as the 'zero' signal, relative to which a significant signal is measured (calibrating).

To prevent cursor movement from a minimal signal change before it can be corrected, cursor movement is produced only when a certain minimal relative signal is detected. That is, there is a dead band in the transfer function—signal values close to but not zero for which no movement is produced.

Hands-off periods may be identified from the properties of the signal itself, or some other means, e.g. a capacitive proximity detector, may be used alone or in combination. In any case this can be done only probabalistically—a small force applied perfectly steadily may exactly mimic a temperature drift, and proximity may not mean contact—with the probability of error depending on the noise level (e.g., high frequency >10 Hz), the signal analysis and other detection method, the length of the signal sample analyzed, and perhaps other factors.

Since the signal is small, control of the noise level is difficult. The testing time should be made as short as possible for two principle reasons. First, the user may touch the stick almost continuously, and the shorter the testing time, the more frequently recalibration can be done and the less likely it is that the signal drift will become large enough to cause cursor drift. Secondly, if cursor drift does occur, it will continue until the stick is untouched for at least a testing time. Further, since signal drift normally occurs slowly (e.g., with temperature or other environmental change), there will normally be an extended period when it is detectable but still within the dead band. This allows a recalibration before a cursor movement occurs, and normally avoids spontaneous cursor movement.

However, this may fail for either of two reasons. First, it may fail if the hands-off test fails continuously while the signal drifts outside the dead band relative to its initial value. Second, it may fail if a "hands-off" period is detected in error, and a recalibration occurs to a signal value which is actually outside the dead band relative to the true "hands-off" signal. In the latter case, the cursor, which is properly in motion, stops and when the stick is released it moves with the opposite velocity until a correct recalibration occurs (e.g., for at least the testing time, and longer if the user interferes).

These two failure causes are conflicting. That is, the first cause may be avoided by making the test less stringent (e.g. shortening the testing time), and the second cause may be avoided by making the test more stringent (e.g. lengthening the testing time). Thus, the solution to date for the TrackPoint system has been to choose a compromise value, first 2.88 seconds with measurement precision 3.2 grams, and currently 0.53 seconds with precision 0.8 grams.

Further, in some other pointing stick systems, an input signal is never recalibrated when the cursor is in motion (the more-stringent test always fails) so that the second case error cannot occur. When cursor drift does occur (due to a first-case error), it continues until the user intervenes, with a special key or a reboot.

Thus, in spite of these and other attempts, cursor drift continues to be a nuisance.

SUMMARY OF THE INVENTION

In view of the foregoing and other problems, disadvantages, and drawbacks of the aforementioned conventional systems and methods, it is a purpose of the exemplary aspects of the present invention to provide a controller, system and method for controlling a cursor which has an improved control of cursor drift.

The present invention includes a controller for controlling a cursor, which includes an identifying module for identifying at least one of a first period when the cursor is in motion and a second period when the cursor is not in motion, and a calibrating module for calibrating an input parameter signal (e.g., to inhibit a cursor drift) using a first hands-off test during the first period Further, the identifying module may input the input parameter signal from a force sensor, and the calibrating module may output a calibrated input parameter signal to an output module. Further, the input parameter signal may include an input parameter signal detected during a period when the force sensor is untouched (e.g., by a user). In addition, a transfer function for generating the cursor movement signal may include a dead band such that the cursor movement signal causes no cursor movement whenever the calibrated input parameter signal has a value within said dead band.

Further, the calibrating module may calibrate the input parameter signal during a hands-off period. That is, the first and second hands-off tests may be used by the calibrating module to determine a hands-off period during which a device (e.g., a pointing stick) for controlling the cursor is not being touched by a user. The calibrating module may then set a signal (e.g., input parameter signal) detected during the hands-off period as a zero signal, relative to which a significant signal (e.g., input parameter signal) is measured.

Further, in an exemplary aspect of the present invention, the first hands-off test may include a duration of at least about 5 seconds, and the second hands-off test may include no more than about 0.53 seconds.

Another exemplary aspect of the present invention includes a cursor control system which includes a force sensor (e.g., a pointing device which is attached to (e.g., included in) the keyboard assembly) which generates an input parameter signal, and a controller operably coupled to the force sensor. The controller includes an identifying module for identifying at least one of a first period when a cursor is in motion and a second period when the cursor is not in motion, and a calibrating module for calibrating an input parameter signal using a first hands-off test during the first period and a second hands-off test, different than the first hands-off test during the second period.

a calibrating module for calibrating an input parameter signal using a first hands-off test during the first period and a second hands-off test, different than the first hands-off test during the second period.

Another exemplary aspect of the present invention includes a keyboard assembly including the inventive cursor control system. For example, the force sensor may include a pointing device which is in a keyboard.

Another exemplary aspect of the present invention includes a computer system which includes a keyboard assembly including the inventive cursor control system, and a display device for displaying a cursor controlled by the cursor control system.

Another exemplary aspect of the present invention includes a method of controlling a cursor. The method includes identifying at least one of a first period when a cursor is in motion and a second period when the cursor is not in motion, and calibrating an input parameter signal using a first hands-off test during the first period and a second hands-off test different than (e.g. less stringent than) the first hands-off test during the second period.

In one exemplaray aspect, the method of controlling a cursor includes identifying at least one of a first period when a cursor is in motion and a second period when the cursor is not in motion, determining a hands-off period during which a device for controlling the cursor is not being touched by a user, by using a first hands-off test during the first period and a second hands-off test different than the first hands-off test during the second period, and calibrating a significant input parameter signal by identifying an input parameter signal detected during the hands-off period as having a zero value, relative to which said significant input parameter signal is measured.

The present invention also includes a programmable storage medium tangibly embodying a program of machine-readable instructions executable by a digital processing apparatus to perform the inventive method.

With its unique and novel features, the present invention provides a controller, system and method for controlling a cursor which has an improved control of cursor drift over conventional controllers, systems and methods.

BRIEF DESCRIPTION OF THE DRAWINGS

The foregoing and other objects, aspects and advantages will be better understood from the following detailed description of the embodiments of the invention with reference to the drawings, in which:

FIG. 4 illustrates a typical hardware configuration 400 that may be used to implement the controller 100, cursor control system 150 and method 300 of controlling a cursor, in accordance with an exemplary aspect of the present invention; and FIG. 5 illustrates a magnetic data storage diskette 500 that may be used to store instructions for performing the inventive method 300, in accordance with an exemplary aspect of the present invention.

DETAILED DESCRIPTION OF THE EMBODIMENTS OF THE INVENTION

Figure 1:
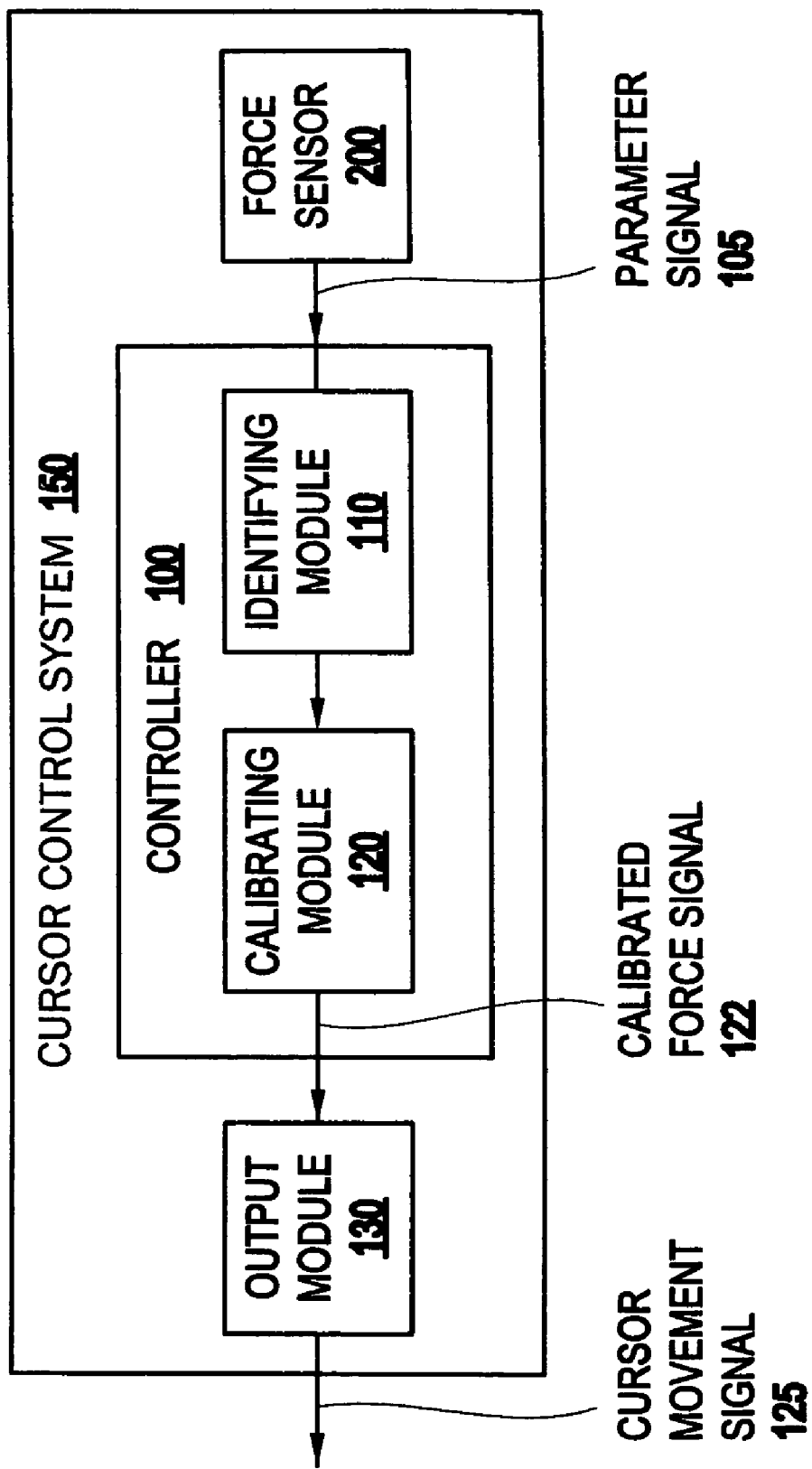
FIG. 1 illustrates a controller 100 for controlling a cursor and a cursor control system 150, in accordance with an exemplary aspect of the present invention.

Referring now to the drawings, FIG. 1 illustrates a controller 100 for controlling a cursor according to an exemplary aspect of the present invention. As shown in FIG. 1, the controller 100 may include an identifying module 110 for identifying at least one of a first period when a cursor is in motion and a second period when the cursor is not in motion, and a calibrating module 120 for calibrating an input parameter signal 105 using a first hands-off test during the first period and a second hands-off test, different than the first hands-off test, during the second period.

As illustrated in FIG. 1, the controller 100 may input a parameter signal 105 from a force sensor 200, and output a calibrated input parameter signal (e.g., calibrated force signal) 122 to an output module 130, which may output a cursor movement signal 125 based on the calibrated force signal 122.

Further, in the exemplary embodiment of FIG. 1, the identifying module 110 and the calibrating module 120 are provided together. Alternatively, these features may be separately provided (e.g., remotely provided) in the present invention. For example, the controller 100 may include several separate and distinct components for providing its features.

As further illustrated in FIG. 1, another exemplary aspect of the present invention includes a cursor control system 150 which includes a force sensor 200 which generates an input parameter signal, the inventive controller 100 operably coupled to the force sensor, for generating a calibrated force signal 122, and an output module 130 which outputs a cursor movement signal 125 based on the calibrated force signal 122.

Figure 2:
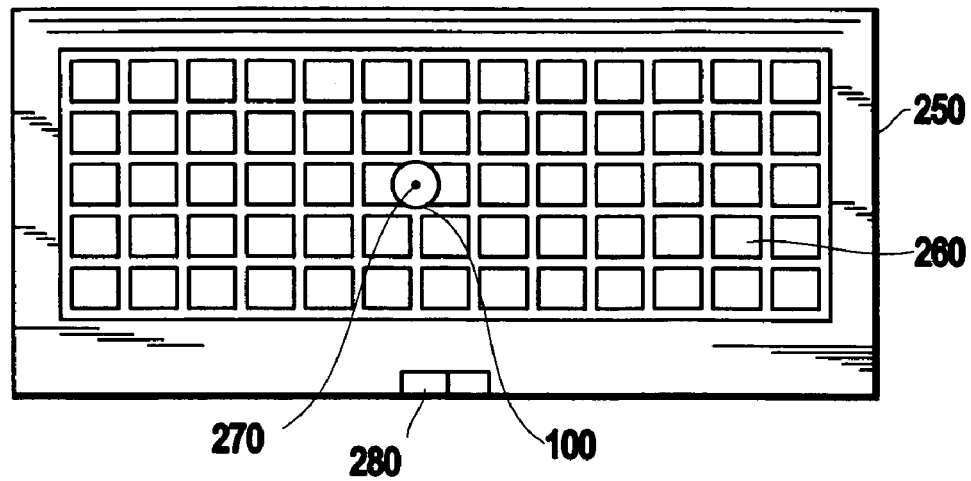
FIG. 2 illustrates a keyboard assembly 250, in accordance with an exemplary aspect of the present invention.

As illustrated in FIG. 2, another exemplary aspect of the present invention includes a keyboard assembly 250 which may be used in accordance with the exemplary aspects of the present invention. For example, features of the controller 100 and/or the cursor control system 150 may be included in (e.g., attached to) the keyboard assembly 250. For example, the keyboard assembly 250 may include a keypad 260 and a pointing device 270 which is included as part of the keyboard assembly 250.

In this exemplary aspect, the pointing device 270 may include, for example, the force sensor 200 of the cursor control system 150. Further, the controller 100 may be formed adjacent to the pointing device 270 in the keyboard assembly 250, or it may be located elsewhere. The keyboard assembly 250 may also include selection buttons 280 associated with the pointing device 270, and may be included with a display device as part of a computer system (e.g., a graphical user interface (GUI)).

The cursor control system of the present invention may be incorporated into a graphical user interface cursor positioning device such as that described in Barrett et al, "Graphical User Interface Cursor Positioning Device Having a Negative Inertia Transfer Function" (U.S. Pat. No. 5,570,111), which is commonly assigned with the present invention, and is incorporated herein by reference.

The pointing stick may be operated with a fingertip, placed on the cap of the pointing stick which may extend, for example, about 1 mm above the adjacent keys.

Functionally, the pointing stick provides cursor positioning and graphic input, duplicating the function of a mouse or trackball, but without requiring the user to leave typing position, and without any additional device to be carried, or requiring desk space. Special processing gives the user a sense of ease of use and positive control.

The pointing stick system may include an internal processing element (e.g., the controller 100 illustrated in FIG. 1) which interfaces with the host through the auxiliary device port. The logical function and electrical interface may be compatible with the mouse and mouse drivers and other software may be used unaltered.

A user may operate the pointing stick system 270 by pushing laterally against the top of the pointing stick with his fingertip. The pointing stick does not necessarily displace, as in the case of a joystick. The input parameter includes the force applied by the user, and the force is mapped to cursor movement. The force against the device is sensed, and the cursor movement is made at a rate determined by the transfer function, over the length of time the pressure is applied.

The speed of cursor movement may be proportional to the magnitude of the force applied, or have some other predetermined relationship, as defined by the device's transfer function. For example, the pointing device system may be implemented as having a sigmoid transfer function, including a "dead zone" in which very small forces are ignored, and a series of regions in the input parameter domain, where, in each region, the cursor movement is a piecewise linear function of the input parameter. The piecewise linear segments approximate the sigmoid shape.

A solution offered by the present invention is to separate the problem of conventional systems into two parts, that is, when the cursor is in motion, and when it is not. When the cursor is in motion, the present invention considers it to be very unlikely that the stick is untouched, so first test (e.g., a very stringent test) is applied. For example, a test time of 5 to 10 seconds with precision of 0.8 grams may be used. It is very unlikely that an erroneous hands-off detection will occur, although if the cursor is in fact drifting, it will continue to do so for a long time.

On the other hand, when the cursor is not in motion, a different hands-off test (e.g., much more lenient test) is applied. For example, a test time of 0.53 seconds may be used. This can catch small hands-off intervals, and track rapid temperature changes. In this case, even if hands-off is incorrectly reported, little harm is done since no erroneous cursor movement will result.

Further, an error causing cursor drift in the present invention is extremely rare. So rare, in fact, that the average user will likely never see it.

Figure 3:
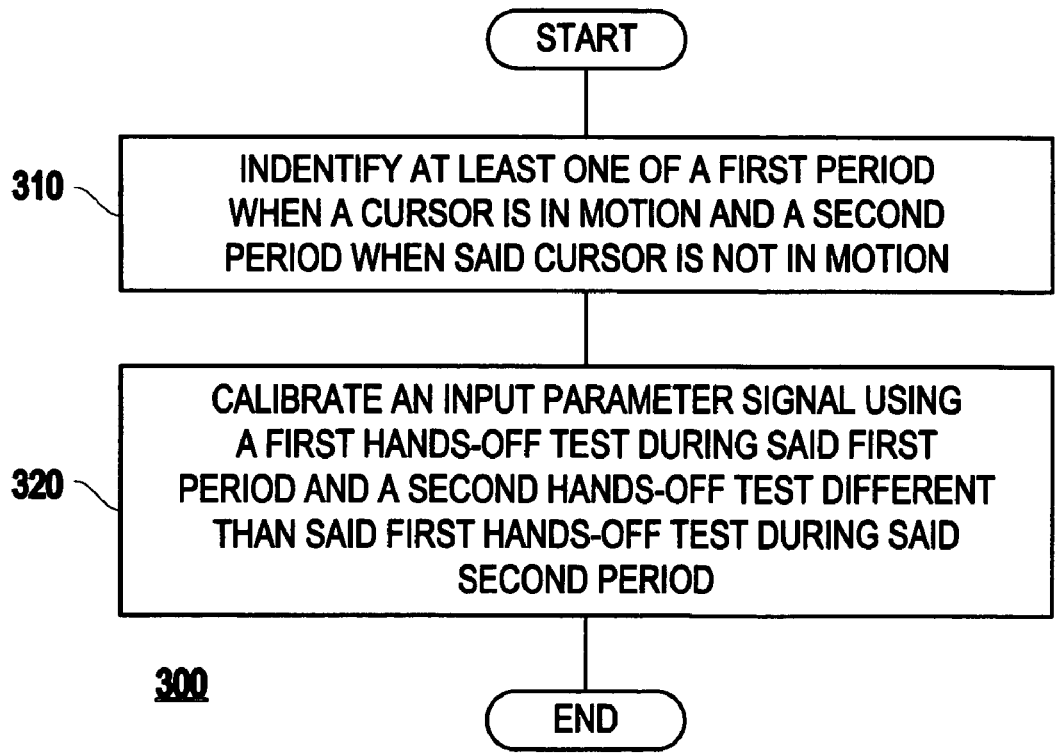
FIG. 3 illustrates a method 300 of controlling a cursor, in accordance with an exemplary aspect of the present invention.

Referring again to the drawings, as illustrated in FIG. 3, another aspect of the present invention includes a method 300 of controlling a cursor. The method 300 includes identifying (310) at least one of a first period when a cursor is in motion and a second period when the cursor is not in motion, and calibrating (320) an input parameter signal using a first hands-off test during the first period and a second hands-off test different than (e.g. less stringent than) the first hands-off test during the second period. For example, the inventive method 300 may include the features similar to that of the inventive controller 100 outlined above.

Referring now to FIG. 4, system 400 illustrates a typical hardware configuration which may be used for implementing the inventive cursor control system and method of controlling a cursor. The configuration has preferably at least one processor or central processing unit (CPU) 411. The CPUs 411 are interconnected via a system bus 412 to a random access memory (RAM) 414, read-only memory (ROM) 416, input/output (I/O) adapter 418 (for connecting peripheral devices such as disk units 421 and tape drives 440 to the bus 412), user interface adapter 422 (for connecting a keyboard 424, mouse 426, speaker 428, microphone 432, pointing stick 427 and/or other user interface device to the bus 412), a communication adapter 434 for connecting an information handling system to a data processing network, the Internet, an Intranet, a personal area network (PAN), etc., and a display adapter 436 for connecting the bus 412 to a display device 438 and/or printer 439. Further, an automated reader/scanner 441 may be included. Such readers/scanners are commercially available from many sources.

In addition to the system described above, a different aspect of the invention includes a computer-implemented method for performing the above method. As an example, this method may be implemented in the particular environment discussed above.

Such a method may be implemented, for example, by operating a computer, as embodied by a digital data processing apparatus, to execute a sequence of machine-readable instructions. These instructions may reside in various types of signal-bearing media.

Thus, this aspect of the present invention is directed to a programmed product, including signal-bearing media tangibly embodying a program of machine-readable instructions executable by a digital data processor to perform the above method.

Such a method may be implemented, for example, by operating the CPU 411 to execute a sequence of machine-readable instructions. These instructions may reside in various types of signal bearing media.

Thus, this aspect of the present invention is directed to a programmed product, including signal-bearing media tangibly embodying a program of machine-readable instructions executable by a digital data processor incorporating the CPU 411 and hardware above, to perform the method of the invention.

This signal-bearing media may include, for example, a RAM contained within the CPU 411, as represented by the fast-access storage for example. Alternatively, the instructions may be contained in another signal-bearing media, such as a magnetic data storage diskette 500 (FIG. 5), directly or indirectly accessible by the CPU 411.

Whether contained in the computer server/CPU 411, or elsewhere, the instructions may be stored on a variety of machine-readable data storage media, such as DASD storage (e.g, a conventional "hard drive" or a RAID array), magnetic tape, electronic read-only memory (e.g., ROM, EPROM, or EEPROM), an optical storage device (e.g., CD-ROM, WORM, DVD, digital optical tape, etc.), paper "punch" cards, or other suitable signal-bearing media including transmission media such as digital and analog and communication links and wireless. In an illustrative embodiment of the invention, the machine-readable instructions may comprise software object code, compiled from a language such as C, C+, etc.

With its unique and novel features, the present invention provides a controller, system and method for controlling a cursor which has an improved control of cursor drift over conventional controllers, systems and methods.

While the invention has been described in terms of one or more embodiments, those skilled in the art will recognize that the invention can be practiced with modification within the spirit and scope of the appended claims. Specifically, one of ordinary skill in the art will understand that the drawings herein are meant to be illustrative, and the design of the inventive assembly is not limited to that disclosed herein but may be modified within the spirit and scope of the present invention.

Further, Applicant's intent is to encompass the equivalents of all claim elements, and no amendment to any claim the present application should be construed as a disclaimer of any interest in or right to an equivalent of any element or feature of the amended claim.

What is claimed is:

1. A controller for controlling a cursor, comprising:
   an identifying module for identifying at least one of a first period when a cursor is in motion and a second period when said cursor is not in motion; and
   a calibrating module for sampling an input parameter signal to detect a hands-off condition using a first hands-off test during said first period and a second hands-off test, different than said first hands-off test, during said second period, and calibrating said input parameter signal when a handsoff condition is detected,
   wherein said first and second hands-off tests comprise a sampling of the input parameter signal, a duration of said sampling in said first hands-off test being greater than a duration of said sampling in said second hands-off test.

2. The controller according to claim 1, wherein said identifying module inputs said input parameter signal from a force sensor, and wherein said calibrating module outputs a calibrated input parameter signal to an output module.

3. The controller according to claim 2, wherein said input parameter signal comprises an input parameter signal detected during a period when a pointing stick connected to said force sensor is untouched by a user.

4. The controller according to claim 2, wherein said output module outputs a cursor movement signal based on said calibrated input parameter signal, and
   wherein a transfer function for generating said cursor movement signal comprises a dead band within which said cursor movement signal causes no cursor movement for a non-zero input parameter signal.

5. The controller according to claim 1, wherein said first and second hands-off tests are used by said calibrating module to determine a hands-off condition in which a device for controlling said cursor is not being touched by a user, and
   wherein said calibrating module calibrates a significant input parameter signal by identifying an input parameter signal detected during said hands-off condition as having a zero value, relative to which said significant input parameter signal is measured.

6. The controller according to claim 1, wherein said input parameter signal is calibrated to inhibit a cursor drift.

7. The controller according to claim 1, wherein said second hands-off test is less stringent than said first hands-off test.

8. The controller according to claim 1, wherein said first hands-off test comprises a duration of at least about 5 seconds, and said second hands-off test comprises no more than about 0.53 seconds.

9. The controller according to claim 1, wherein said controller is included in a pointing stick system, and said input parameter signal measures a force applied to a point stick in said pointing stick system.

10. The controller according to claim 1, wherein said calibrating said input parameter signal comprises sampling said input parameter signal using a first sampling time during said first period and a second sampling time different than said first sampling time during said second period.

11. The controller according to claim 1, wherein said first hands-off test comprises a duration that is longer than a duration of said second hands-off test.

12. The controller according to claim 1, wherein said calibrating module calibrates said input parameter signal only when said hands-off condition is detected.

13. A cursor control system, comprising:
   a force sensor which generates an input parameter signal; and
   a controller operably coupled to said force sensor, comprising:
      an identifying module for identifying at least one of a first period when a cursor is in motion and a second period when said cursor is not in motion; and
      a calibrating module for sampling an input parameter signal to detect a hands-off condition using a first hands-off test during said first period and a second hands-off test, different than said first hands-off test, during said second period, and calibrating said input parameter signal when a hands-off condition is detected,
   wherein said first and second hands-off tests comprise a sampling of the input parameter signal, a duration of said sampling in said first hands-off test being greater than a duration of said sampling in said second hands-off test.

14. The cursor control system according to claim 13, further comprising:
   an output module which receives a calibrated input parameter signal from said calibrating module and outputs a cursor movement signal based on said calibrated input parameter signal.

15. The cursor control system according to claim 13, wherein said force sensor comprises a pointing device which is integrally-formed in a keyboard assembly.

16. The cursor control system according to claim 13, wherein said calibrating module calibrates said input parameter signal when a device for controlling said cursor is in a hands-off condition.

17. The cursor control system according to claim 13, wherein said first hands-off test comprises a first sampling time, and said second hands-off test comprises a second sampling time which is less than said first sampling time.

18. The cursor control system according to claim 13, wherein said first hands-off test comprises a duration of at least about 5 seconds, and said second hands-off test comprises no more than about 1 second.

19. A keyboard assembly comprising the cursor control system according to claim 13, wherein said force sensor comprises a pointing device which is integrally formed in a keyboard.

20. A computer system, comprising
   a keyboard assembly comprising the cursor control system according to claim 13; and
   a display device for displaying a cursor controlled by said cursor control system.

21. A method of controlling a cursor, comprising:
   identifying at least one of a first period when a cursor is in motion and a second period when said cursor is not in motion; and
   sampling an input parameter signal to detect a hands-off condition using a first hands-off test during said first period and a second hands-off test, different than said first hands-off test, during said second period, and calibrating said input parameter signal when a hands-off condition is detected,
   wherein said first and second hands-off tests comprise a sampling of the input parameter signal, a duration of said sampling in said first hands-off test being greater than a duration of said sampling in said second hands-off test.

22. A method of controlling a cursor, comprising:
   identifying at least one of a first period when a cursor is in motion and a second period when said cursor is not in motion;

sampling an input parameter signal to detect a hands-off condition in which a device for controlling said cursor is not being touched by a user, by using a first hands-off test during said first period and a second hands-off test different than said first hands-off test during said second period; and calibrating a significant input parameter signal by identifying an input parameter signal detected when a device for controlling said cursor is in said hands-off condition as having a zero-value, relative to which said significant input parameter signal is measured, wherein said first and second hands-off tests comprise a sampling of the input parameter signal, a duration of said sampling in said first hands-off test being greater than a duration of said sampling in said second hands-off test.

23. A programmable storage medium tangibly embodying a program of machine-readable instructions executable by a digital processing apparatus to perform a method of controlling a cursor, said method comprising:

identifying at least one of a first period when a cursor is in motion and a second period when said cursor is not in motion; and sampling an input parameter signal to detect a hands-off condition using a first hands-off test during said first period and a second hands-off test, different than said first hands-off test, during said second period, and calibrating said input parameter signal when a hands-off condition is detected, wherein said first and second hands-off tests comprise a sampling of the input parameter signal, a duration of said sampling in said first hands-off test being greater than a duration of said sampling in said second hands-off test.

* * * * *